UNITED STATES PATENT OFFICE.

LEVI B. SNOW AND JAMES HOWARD, OF WICHITA, KANSAS; SAID HOWARD ASSIGNOR TO WILLIAM RARDON, OF SAME PLACE.

COMPOSITION OF MATTER FOR TANNING HIDES.

SPECIFICATION forming part of Letters Patent No. 383,379, dated May 22, 1888.

Application filed November 29, 1887. Serial No. 256,416. (No specimens.)

*To all whom it may concern:*

Be it known that we, LEVI B. SNOW and JAMES HOWARD, citizens of the United States, residing at Wichita, in the county of Sedgwick and State of Kansas, have invented certain new and useful Improvements in Composition of Matter for Tanning Hides; and we do hereby declare the following to be a full, clear, and exact description of the invention, such as will enable others skilled in the art to which it appertains to make and use the same.

Our invention relates to the art of tanning hides; and our said invention consists of a composition of matter for tanning the hides, composed of the following ingredients combined in about the proportion stated, viz: To five bushels of Osage oranges add two pounds of common salt and one pound of pulverized alum. Cover with soft water and let stand until fermentation commences. Then express the juice from the oranges and add to this juice one pound of ground Sicily sumac-berries and one pound of extract of hemlock. Into this composition from three to four large hides or ten to twelve calf-skins are to be immersed and retained therein from six to eight days, each skin being handled or turned each day, after which they will be found to be thoroughly tanned.

The principal ingredient or basis of this composition is the juice of the Osage oranges, while the extract of hemlock and ground sumac-berries act as aids to the basis. Instead of the extract of hemlock and ground sumac-berries, any other similar suitable aids may be employed in the place thereof—such as oak bark, tannin, &c.—but the compound herein specified is preferred.

We claim—

1. A composition for use in tanning hides, consisting of the juice of the Osage orange, extract of hemlock, and ground sumac-berries, in the proportions substantially as specified.

2. A composition for use in tanning hides, consisting of the juice of the Osage orange, extract of hemlock, ground sumac-berries, salt, and alum, in the proportions substantially as specified.

LEVI B. SNOW.
JAMES HOWARD.

In presence of—
JOHN R. PARSONS,
EDW. O'BRYAN.